US007311158B2

(12) United States Patent
Perez

(10) Patent No.: US 7,311,158 B2
(45) Date of Patent: Dec. 25, 2007

(54) SILICATE-CONTAINING ADDITIVES FOR WELL BORE TREATMENTS AND ASSOCIATED METHODS

(75) Inventor: Gregory P. Perez, Pearland, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 269 days.

(21) Appl. No.: 11/027,313

(22) Filed: Dec. 30, 2004

(65) Prior Publication Data

US 2006/0144594 A1 Jul. 6, 2006

(51) Int. Cl.
*E21B 21/00* (2006.01)
*E21B 37/00* (2006.01)
*C09K 8/06* (2006.01)
*C09K 8/32* (2006.01)
*C09K 8/524* (2006.01)

(52) U.S. Cl. .................. 175/64; 175/65; 166/312; 507/140; 507/910; 507/930

(58) Field of Classification Search .................. 175/64, 175/65, 72; 166/312; 507/140, 910, 930
See application file for complete search history.

(56) References Cited

U.S. PATENT DOCUMENTS

| | | | | |
|---|---|---|---|---|
| 2,342,656 A | * | 2/1944 | Frye et al. | 507/203 |
| 2,430,039 A | * | 11/1947 | Anderson | 507/126 |
| 3,168,920 A | * | 2/1965 | Barrett | 166/294 |
| 3,190,832 A | * | 6/1965 | Messenger | 507/126 |
| 3,679,001 A | | 7/1972 | Hill | 166/292 |
| 3,830,735 A | | 8/1974 | Tsuk | 210/43 |
| 3,929,632 A | | 12/1975 | Buriks et al. | 210/43 |
| 4,331,554 A | | 5/1982 | Quinlan | 252/344 |
| 4,525,285 A | | 6/1985 | Son et al. | |
| 4,888,120 A | | 12/1989 | Mueller et al. | |
| 5,755,295 A | | 5/1998 | Hayatdavoudi et al. | 175/65 |
| 6,173,776 B1 | | 1/2001 | Furman et al. | 166/279 |
| 6,609,067 B2 | * | 8/2003 | Tare et al. | 702/9 |
| 6,642,183 B1 | | 11/2003 | Bass et al. | 507/129 |
| 6,716,799 B1 | | 4/2004 | Mueller et al. | 507/138 |
| 6,806,235 B1 | | 10/2004 | Mueller et al. | 507/138 |
| 6,817,426 B2 | | 11/2004 | Quintero | 175/66 |
| 7,081,438 B2 | | 7/2006 | Horton | 507/128 |
| 2004/0116304 A1 | | 6/2004 | Wu et al. | 507/100 |
| 2004/0204324 A1 | | 10/2004 | Baltoui et al. | 507/100 |
| 2005/0082231 A1 | * | 4/2005 | Gochin | 210/696 |
| 2006/0148656 A1 | * | 7/2006 | Perez | 507/140 |

FOREIGN PATENT DOCUMENTS

RU 2184213 6/2002
WO PCT WO 97/12947 4/1997

OTHER PUBLICATIONS

Baroid brochure entitled "DEEP-TREAT™ Wetting Agent/Thinner" dated 2004.
Baroid brochure entitled "LE™ MUL Emulsion Stabilizer" dated 2004.
Baroid brochure entitled "LE™ SUPERMUL" dated 2004.
Foreign communication from a related counterpart application dated May 24, 2006.
E. van Oort, et al., "Silicate-Based Drilling Fluids: Competent, Cost-effective and Benign Solutions to Wellbore Stability Problems," IADC/SPE Paper 35059.
M.A. Freeman, et al., "Novel Drilling Fluid Eliminates Tar Problems Associated with Drilling SAGD Wells," SPE Paper 90986.
Yongsheng Zhang, et al., "Effect of Synthetic Drilling Fluid Base Oils on Asphaltene Stability and Wetting in Sandstone Cores," *Energy & Fuels*.
Office Action dated Mar. 8, 2007 from U.S. Appl. No. 11/615,355.
Office Action dated May 17, 2007 from U.S. Appl. No. 11/027,310.

* cited by examiner

*Primary Examiner*—George Suchfield
(74) *Attorney, Agent, or Firm*—Craig W. Roddy; Baker Botts, LLC

(57) ABSTRACT

The present invention relates to methods and compositions for use in subterranean operations. More particularly, the present invention relates to additives comprising one or more silicates used to treat tar resident in a well bore, and methods of use. In one embodiment, the present invention provides a method of treating tar resident in a well bore comprising providing a tar-treating additive comprising one or more silicates introducing the tar-treating additive into the well bore; and allowing the tar-treating additive to react with the tar resident in the well bore so as to at least partially reduce the adhesiveness of the tar.

13 Claims, No Drawings

SILICATE-CONTAINING ADDITIVES FOR WELL BORE TREATMENTS AND ASSOCIATED METHODS

BACKGROUND

The present invention relates to methods and compositions for use in subterranean operations. More particularly, the present invention relates to additives comprising one or more silicates used to treat tar resident in a well bore, and methods of use.

Many subterranean operations involve the drilling of a well bore from the surface through rock and/or soil to penetrate a subterranean formation containing fluids that are desirable for production. Such drilling operations may include any suitable technique for forming a well bore that penetrates a subterranean formation. Rotary drilling operations typically involve attaching a drill bit on a lower end of a drillstring to form a drilling tool and rotating the drill bit along with the drillstring into a subterranean formation to create a well bore through which subsurface formation fluids may be produced. In another method of drilling, coiled tubing may be used instead of jointed pipe and the drill bit may be rotated using a downhole motor. During drilling, drilling fluids may be used, inter alia, to lift or circulate formation cuttings out of the well bore to the surface and to cool the drill bit. Generally, after a well bore has been drilled to a desired depth, the drillstring may be removed from the well bore, and a variety of completion and stimulation operations, including cementing, fracturing treatments, sand control treatments, and remedial treatments may be performed.

In the course of drilling operations, the drillstring and/or other equipment may come into contact with zones of rock and/or soil containing tar; in many such operations, it may be desirable to drill the well bore through these tar-containing zones. However, tar is a relatively tacky substance that may readily adhere to any surface that it contacts, including the surfaces of the well bore and/or any equipment utilized during the drilling operation. Tar also may dissolve into many synthetic treatment fluids used in the course of drilling operations, increasing the tacky and adhesive properties of the tar. If a sufficient amount of tar adheres to surfaces in the well bore or drilling equipment, it may, among other things, prevent the drillstring from rotating, prevent fluid circulation, or otherwise impede the effectiveness of a drilling operation. In some cases, it may become necessary to remove and/or disassemble the drillstring in order to remove accretions of tar, a process which may create numerous cost and safety concerns. The accretion of tar on drilling equipment and/or in the well bore also can impede any subsequent operations downhole, including cementing, acidizing, fracturing, sand control, and remedial treatments.

Existing methods of managing these problems that result from well bore tar incursion have not been successful. Some of these methods involve effecting an increase in hydrostatic pressure in the well bore so as to force the tar out of the well bore to the surface. However, this increased hydrostatic pressure may damage the well bore and/or a portion of the subterranean formation. Other conventional methods utilize treatment fluids that comprise dispersants, surfactants, and/or solubilizers, which allow the tar particles to dissolve in or homogenize with the treatment fluids. However, the tar particles may not be readily separated out of the fluid once they have dissolved into or homogenized with the fluid. The presence of the tar particles in the treatment fluid may alter its rheological properties and/or suspension capacity, which may limit its use in subsequent operations. Moreover, the addition of these dispersants, surfactants, and solubilizers may dramatically increase the complexity and cost of the drilling operation.

SUMMARY

The present invention relates to methods and compositions for use in subterranean operations. More particularly, the present invention relates to additives comprising one or more silicates used to treat tar resident in a well bore, and methods of use.

In one embodiment, the present invention provides a method of treating tar resident in a well bore comprising: providing a tar-treating additive comprising one or more silicates; introducing the tar-treating additive into the well bore; and allowing the tar-treating additive to react with the tar resident in the well bore so as to at least partially reduce the adhesiveness of the tar.

In another embodiment, the present invention provides a method of A method of treating tar resident in a well bore comprising: providing a treatment fluid comprising a base fluid and a tar-treating additive comprising one or more silicates; introducing the treatment fluid into the well bore; and allowing the tar-treating additive in the treatment fluid to react with the tar resident in the well bore so as to at least partially reduce the adhesiveness of the tar.

In another embodiment, the present invention provides a method of drilling a portion of a well bore in a subterranean formation comprising: providing a treatment fluid that comprises a base fluid and a tar-treating additive comprising one or more silicates; and drilling at least a portion of the well bore in the subterranean formation.

The features and advantages of the present invention will be readily apparent to those skilled in the art upon a reading of the description of the embodiments that follows.

DESCRIPTION

The present invention relates to methods and compositions for use in subterranean operations. More particularly, the present invention relates to additives comprising one or more silicates used to treat tar resident in a well bore, and methods of use.

The treatment fluids of the present invention generally comprise a base fluid and a tar-treating additive comprising one or more silicates. Examples of suitable silicates include, but are not limited to, sodium silicates and potassium silicates. In some embodiments, the tar-treating additives may comprise one or more silicates in a water-based solution. In certain embodiments of this type, the silicates may be present in the aqueous solution in an amount of about 40% by weight of the solution. In other embodiments, the tar-treating additives also may comprise pure silicates (e.g., in solid or liquid form). The tar-treating additives may also comprise additional components, inter alia, to enhance the performance of these tar-treating additives in specific applications. For example, the tar-treating additive may comprise a viscosifier to, among other things, aid in suspending the tar-treating additive in a drilling fluid. Suitable viscosifying agents may include, but are not limited to, colloidal agents (e.g., clays, polymers, guar gum), emulsion forming agents, diatomaceous earth, biopolymers, synthetic polymers, chitosans, starches, gelatins, or mixtures thereof. In certain embodiments, the tar-treating additive may be present in the treatment fluids of the present invention in an amount such that the concentration of silicates in the treatment fluid is at least about 10% by volume of the treatment fluid, and up to an amount such that the properties of the treatment fluid (e.g., viscosity) are altered so that the treatment fluid is no longer suitable for the particular application. In certain embodiments, the tar-treating additive may be present in the treatment fluids of the present invention in an amount such that the concentration of silicates in the treatment fluid is in a range of from about 20% to about 40% by volume of the treatment fluid. One of ordinary skill in the art, with the benefit of this disclosure, will be able to determine the appropriate concentration of the tar-treating additive in the treatment fluid of a particular application.

The base fluid utilized in the treatment fluids of the present invention may be aqueous-based or non-aqueous-based, or a mixture thereof. Where the base fluid is aqueous-based, it may comprise fresh water, salt water (e.g., water containing one or more salts dissolved therein), brine (e.g., saturated salt water), or seawater. Generally, the water can be from any source, provided that it does not contain compounds that adversely affect other components of the treatment fluid. Where the base fluid is non-aqueous-based, the base fluid may comprise any number of organic liquids. Examples of suitable organic liquids include, but are not limited to, mineral oils, synthetic oils, esters, and the like. An example of a suitable commercially-available non-aqueous-based base fluid is ESTEGREEN™ mud, available from Union Oil Company of California.

The treatment fluids of the present invention optionally may comprise additional additives to enhance the performance of the treatment fluid. The treatment fluids of the present invention may comprise any such additional additives that do not adversely react with the silicates or other components of the treatment fluid. Examples of suitable additional additives include, but are not limited to, gelling agents, breakers, stabilizers, fluid loss control additives, surfactants, clay stabilizers, bactericides, emulsifiers, and the like. One of ordinary skill in the art, with the benefit of this disclosure, will be able to determine which additional additives are appropriate for a particular application.

Generally, the methods of the present invention comprise allowing a tar-treating additive comprising one or more silicates to react with tar resident in a well bore, thereby reducing the adhesiveness of the tar, inter alia, to facilitate removal of that tar from a well bore or other surface. When the tar-treating additive reacts with tar, it alters the adhesive properties of the tar such that the tar is less tacky and it becomes more brittle and dirt-like. In applications where it is desirable to drill through tar encountered in the course of drilling a well bore, drilling through tar altered in this way may yield tar-cuttings that can be removed more effectively from the well bore. Additionally, tar which is drilled-through may be less likely to flow into the well bore or the subterranean formation as the plastic properties of the tar are altered.

In one embodiment, the present invention provides a method of treating tar resident in a well bore comprising: providing a tar-treating additive comprising one or more silicates, introducing the tar-treating additive into the well bore, and allowing the tar-treating additive to react with the tar resident in the well bore so as to at least partially reduce the adhesiveness of the tar. Introducing the tar-treating additive to the vicinity of a desired portion of the well bore may be accomplished by a variety of methods known by a person of ordinary skill in the art with the benefit of this disclosure. One example of such a method comprises pumping water into the well bore, wherein the tar-treating additive is carried into the well bore on the leading edge of the water. In other embodiments of this method, the additive may be pumped into the well bore while suspended in a treatment fluid (e.g., a drilling fluid). In certain embodiments, the tar-treating additive may be provided as a "spot treatment," wherein the tar-treating additive is pumped into the well bore to react with tar in a specific portion of the well bore. In certain embodiments of this type, the tar-treating additive may be allowed to react with the tar resident in the well bore for at least a time sufficient to at least partially reduce the adhesiveness of the tar. In some circumstances, this may be more than about one hour. In others, more time will be required to at least partially reduce the adhesiveness of the tar, depending upon, among other factors, the temperature inside the well bore and the amount of tar in the portion of the well bore being treated. One of ordinary skill in the art, with the benefit of this disclosure, will be able to determine the appropriate amount of time to allow the tar-treating additive to react with the tar according to these factors. An example of one of these "spot treatment" embodiments, as tested in a laboratory experiment, is described below in Example 1. In certain embodiments, after the tar-treating additive has been allowed to react with the tar, the tar then may be removed from the well bore by any means practicable for the given application.

In another embodiment, the present invention provides a method of treating tar resident in a well bore comprising: providing a treatment fluid comprising a base fluid and a tar-treating additive comprising one or more silicates, introducing the treatment fluid into the well bore, and allowing the tar-treating additive in the treatment fluid to react with the tar resident in the well bore so as to at least partially reduce the adhesiveness of the tar. In certain embodiments of this type, the tar-treating additive may be allowed to react with the tar as long as the treatment fluid is present in the well bore. One of ordinary skill in the art, with the benefit of this disclosure, will be able to determine the appropriate amount of time to allow the tar-treating additive to react with the tar so as to at least partially reduce the adhesiveness of the tar. An example of one such treatment employing a treatment fluid of the present invention, as tested in a laboratory experiment, is described below in Example 2. In certain embodiments, after the tar-treating additive has been allowed to react with the tar, the tar then may be removed from the well bore by any means practicable for the given application.

In another embodiment, the present invention provides a method of drilling a portion of a well bore in a subterranean formation comprising: providing a treatment fluid that comprises a base fluid and a tar-treating additive comprising one or more silicates; and drilling at least a portion of the well bore in the subterranean formation. In certain embodiments, tar may be present within the well bore, and the tar-treating additive may be allowed to react with the tar so as to at least partially reduce the adhesiveness of the tar. In certain embodiments, after the tar-treating additive has been allowed to react with the tar, the tar then may be removed from the well bore by any means practicable for the given application.

To facilitate a better understanding of the present invention, the following examples of specific embodiments are given. In no way should the following examples be read to limit or define the entire scope of the invention.

EXAMPLES

Example 1

The methods of the present invention were tested in the laboratory using samples of tar commonly found in the Gulf Coast region. A 200 g-sample of tar was placed in each of three 350 mL lab barrels, along with a steel rod that had been weighed previously. Then, 55.97 g of a clay-free synthetic-based drilling fluid was added to the first lab barrel (Barrel 1A), 51.52 g of 20% calcium chloride aqueous solution was added to the second lab barrel (Barrel 1B), and 55.53 g of a tar-treating additive composed of 40% sodium silicate (by weight) in aqueous solution was added to the third lab barrel (Barrel 1C). The lab barrels then were sealed and placed in a hot rolling oven at 150° F. for 16 hours. Afterwards, the lab barrels were removed from the oven, and their contents were removed. The steel rods were weighed in order to determine the mass of tar still adhered to the rods. The results of these tests are summarized in Table 1 below.

TABLE 1

| Barrel | Initial rod mass (g) | Post-rolling rod mass (g) | Mass of tar adhered to rod (g) | Observations |
|---|---|---|---|---|
| 1A | 340.79 | 377.54 | 36.75 | Mud has dissolved into the tar. Tar is tacky to the touch and has a firm consistency. Tar adhered to the rod cannot be scraped away easily. |
| 1B | 343.30 | 359.31 | 16.01 | Tar has a thick, pasty consistency that does not adhere to the rod in a rigid/solid block. Tar is moist and pliable to the touch. The tar that is present on the rod is scraped away relatively easily as a thick paste rather than a hard cake. |
| 1C | 342.21 | 342.72 | 0.51 | Tar is hard and brittle and does not adhere to the rod. Thick cake is pressed against the walls of the cell but is removed relatively easily as a brittle solid. Tar has a dry, crumbly consistency that forms a coarse powder. |

Example 2

In this example, a 200 g-sample of tar recovered from the Gulf Coast region was placed in each of three 350 mL lab barrels, along with a steel rod that had been weighed previously. Then, 51.97 g ESTEGREEN™ mud was added to each of the first and second lab barrels (Barrels 2A and 2B). Additionally, 10 g of DEEPTREAT™, a wetting agent and thinner commercially available from available from the Baroid Division of Halliburton Energy Services, Inc., Houston, Tex., was added to the first lab barrel (Barrel 2A). A heavy emulsifier package, composed of 9 g LEMUL™ and 3 g SUPERMUL, commercially available from available from the Baroid Division of Halliburton Energy Services, Inc., Houston, Tex., was added to the second lab barrel (Barrel 2B). Finally, 25.98 g ESTEGREEN™ mud and 27.76 g of a tar-treating additive composed of 40% sodium silicate (by weight) in aqueous solution were added to the third lab barrel (Barrel 2C). The lab barrels were then sealed and placed in a hot rolling oven at 150° F. for 16 hours. Afterwards, the lab barrels were removed from the oven, and their contents were removed. The steel rods were weighed in order to determine the mass of tar still adhered to the rods. The results of these tests are summarized in Table 2 below.

Example 3

In this example, a pre-weighed steel rod was placed in a 350 mL lab barrel, to which 100 g tar recovered from the Gulf Coast region and 25.98 g ESTEGREEN™ mud were added. The lab barrel was sealed and placed in a hot rolling oven at 150° F. for 16 hours. Afterwards, the lab barrel was removed from the oven, and its contents were removed. The steel rod was weighed in order to determine the mass of tar still adhered to the rod. These measurements are shown in the first row of Table 3 below. Then, 65.53 g of a tar-treating additive composed of 40% sodium silicate (by weight) in aqueous solution was added to the lab barrel, as well as the former contents of the lab barrel. The lab barrel was re-sealed and placed in the same hot rolling oven for another 16 hours, after which the steel rod was removed and weighed. These measurements are shown in the second row of Table 3 below.

TABLE 2

| Barrel | Initial rod mass (g) | Post-rolling rod mass (g) | Mass of tar adhered to rod (g) | Observations |
|---|---|---|---|---|
| 2A | 340.46 | 358.09 | 17.63 | Tar has formed a hard-packed coating on steel rod. Tar has a very firm and tacky consistency. Tar is not removed easily from steel rod, but can be scraped away in firm chunks. Tar is more compact/firm than with treatments with ESTEGREEN alone (as in Example 3 below). Mud is fully dissolved into tar. |
| 2B | 340.75 | 380.56 | 39.81 | Tar has formed a thick, firm tar coating on surface of steel rod. Tar has a tacky, oily consistency that is attached to steel rod. Tar can be scraped from surface of rod as a highly viscous paste. Tar is not as firm a coating compared to ESTEGREEN alone (as in Example 3 below), but more tacky. |
| 2C | 342.13 | 342.15 | 0.02 | No appreciable presence of tar on steel rod surface. Tar is slightly oily in consistency but is still brittle and a packed layer covers the cell wall. Compared to treatment without a mud (see Barrel 1C in Example 1 above), tar is not as dry but still does not exhibit any surface tackiness. Tar is removed from inner cell wall easily and can be crumbled with minimal force. |

TABLE 3

| Barrel Contents | Initial rod mass (g) | Post-rolling rod mass (g) | Mass of tar adhered to rod (g) | Observations |
|---|---|---|---|---|
| tar + ESTEGREEN | 343.17 | 373.35 | 30.18 | As previously noted, tar readily adheres to the surface of the rod and has a firm, tacky consistency. |
| tar + ESTEGREEN + tar-treating additive | 343.17 | 343.66 | 0.49 | Steel rod is notably absent of adhered tar. Tar has a slightly oily nature with a firm and crumbly consistency. Tar is not as dry as seen when treated solely & directly with tar-treating additive (see Barrel 1C in Example 1 above). Most closely resembles tar treated with 50/50 ESTEGREEN/tar-treating additive fluid (Barrel 2C in Example 2 above). |

Example 4

In this example, 100 g of tar recovered from the Gulf Coast region, 25.98 g ESTEGREEN™ mud, and a pre-weighed steel rod were placed in a 350 mL lab barrel. The lab barrel was sealed and placed in a hot rolling oven at 150° F. for 16 hours. Afterwards, the lab barrel was removed from the oven, and its contents were removed. The steel rod was then weighed in order to determine the mass of tar still adhered to the rod. These measurements are shown in the first row of Table 4 below. Then, the former contents of the lab barrel were returned to it, and 65.53 g of a tar-treating additive composed of 40% sodium silicate (by weight) in aqueous solution was added. The lab barrel was re-sealed and placed in the same hot rolling oven. The contents of the lab barrel were removed after 2 hours, 4 hours, 7 hours, and 71 hours, and the contents of the lab barrel were observed and recorded at each of those times. These observations are summarized in Table 4 below.

TABLE 4

| Time (hrs) | Initial rod mass (g) | Post-rolling rod mass (g) | Mass of tar adhered to rod (g) | Observations |
|---|---|---|---|---|
| 0 | 340.41 | 379.76 | 39.35 | As previously noted, tar readily adheres to the surface of the rod and has a firm, tacky consistency. |
| 2 | 340.41 | 347.81 | 7.40 | After 2 hours of hot-rolling with the tar-treating additive, the tar had become pasty in texture with a majority of the accreted tar no longer attached to the steel rod. |
| 4 | 340.41 | 348.97 | 8.56 | The tar continues to exhibit a pasty texture with no noticeable change in composition since the 2-hour mark. |
| 7 | 340.41 | 341.19 | 0.78 | Tar was fully removed from rod. Tar still has a pasty, oily consistency and has been packed on the inside of the cell. |
| 71 | 340.41 | 340.64 | 0.23 | Rod remains free of accreted tar following extensive hot-rolling with the additive treatment. |

Therefore, the present invention is well adapted to attain the ends and advantages mentioned as well as those that are inherent therein. While numerous changes may be made by those skilled in the art, such changes are encompassed within the spirit of this invention as defined by the appended claims.

What is claimed is:

1. A method comprising:
   providing a treatment fluid that comprises
      a base fluid, and
      a tar-treating additive comprising one or more silicates;
   using the treatment fluid to drill at least a portion of a well bore in a subterranean formation, wherein tar is present within the well bore; and
   allowing the tar-treating additive in the treatment fluid to react with tar in the well bore so as to at least partially reduce the adhesiveness of the tar.

2. The method of claim 1 further comprising removing the tar from the well bore.

3. The method of claim 1 wherein the tar-treating additive further comprises a viscosifier.

4. The method of claim 1 wherein the tar-treating additive is present in the treatment fluid in an amount such that the concentration of silicates in the treatment fluid is at least 10% by volume of the treatment fluid.

5. The method of claim 1 wherein the silicates comprise at least one silicate selected from the group consisting of sodium silicate, potassium silicate, and derivatives thereof.

6. The method of claim 1 wherein the base fluid comprises at least one fluid selected from the group consisting of aqueous-based fluids, non-aqueous-based fluids, and derivatives thereof.

7. The method of claim 1 wherein the treatment fluid comprises a drilling fluid.

8. The method of claim 1 wherein the treatment fluid further comprises at least one additive selected from the group consisting of gelling agents, breakers, stabilizers, fluid loss control additives, surfactants, clay stabilizers, bactericides, emulsifiers, and derivatives thereof.

9. A method comprising:
   providing a treatment fluid that comprises
      a base fluid, and
      a tar-treating additive comprising one or more silicates;
   using the treatment fluid to drill at least a portion of a well bore in a subterranean formation, wherein tar is present within the well bore;
   allowing the tar-treating additive in the treatment fluid to react with tar in the well bore so as to at least partially reduce the adhesiveness of the tar; and
   removing the tar from the well bore.

10. The method of claim 9 wherein the tar-treating additive further comprises a viscosifier.

11. The method of claim 9 wherein the tar-treating additive is present in the treatment fluid in an amount such that the concentration of silicates in the treatment fluid is at least 10% by volume of the treatment fluid.

12. The method of claim 9 wherein the silicates comprise at least one silicate selected from the group consisting of sodium silicate, potassium silicate, and derivatives thereof.

13. The method of claim 9 wherein the base fluid comprises at least one fluid selected from the group consisting of aqueous-based fluids, non-aqueous-based fluids, and derivatives thereof.

* * * * *